United States Patent [19]
Morimoto et al.

[11] Patent Number: 5,211,514
[45] Date of Patent: May 18, 1993

[54] TRANSPORT PLUG FOR USE IN PNEUMATICALLY TRANSPORTING SOLID MATERIALS AND A PNEUMATIC TRANSPORT METHOD EMPLOYING THE TRANSPORT PLUG

[75] Inventors: Kiyoshi Morimoto; Teiichi Miwa; Shinzo Ishii, all of Mishima; Murata Kazue, Ikoma, all of Japan

[73] Assignees: Kyowa Hakko Kogyo Co., Ltd., Tokyo; Kabushikikaisha Matsui Seisakusho, Osaka, both of Japan

[21] Appl. No.: 791,974

[22] Filed: Nov. 13, 1991

[30] Foreign Application Priority Data

Nov. 13, 1990 [JP] Japan .................. 2-308004

[51] Int. Cl.$^5$ ............................ B65G 51/06
[52] U.S. Cl. .................... 406/186; 406/184; 406/190
[58] Field of Search ............ 406/184, 186, 190, 111, 406/13

[56] References Cited

U.S. PATENT DOCUMENTS

| | | | |
|---|---|---|---|
| 1,826,833 | 10/1931 | Shannehan | 406/186 |
| 4,904,127 | 2/1990 | Morimoto et al. | 406/49 X |
| 5,056,962 | 10/1991 | Morimoto et al. | 406/13 X |
| 5,092,714 | 3/1992 | Porter et al. | 406/111 X |

FOREIGN PATENT DOCUMENTS

| | | | |
|---|---|---|---|
| 376668 | 7/1990 | European Pat. Off. | 406/49 |
| 899923 | 12/1953 | Fed. Rep. of Germany | 406/184 |
| 1293695 | 4/1969 | Fed. Rep. of Germany | 406/184 |
| 1440824 | 11/1988 | U.S.S.R. | 406/186 |
| 1505861 | 9/1989 | U.S.S.R. | 406/192 |
| 8909173 | 10/1989 | World Int. Prop. O. | 406/49 |

*Primary Examiner*—Russell D. Stormer
*Assistant Examiner*—James M. Kannofsky
*Attorney, Agent, or Firm*—Koda and Androlia

[57] ABSTRACT

A transport plug for pneumatically transporting solid materials in a transport pipe by the use of a pressurized transport gas and a pneumatic transport method of solid materials employing the transport plug. The transport plug comprises two bodies consisting of a front body and a rear body defining a material storing space for storing solid materials between the two bodies, at least one supplementary body connected to the rear body, and flexible connecting means coupling said three bodies. A supplementary material storing space is defined between the supplementary body and the rear body. Solid materials are fed into the material storing space of the transport plug, transported through the transport pipe together with the transport plug, and received in a collector under gravitational fall.

4 Claims, 7 Drawing Sheets

TRANSPORT PLUG FOR USE IN PNEUMATICALLY TRANSPORTING SOLID MATERIALS AND A PNEUMATIC TRANSPORT METHOD EMPLOYING THE TRANSPORT PLUG

BACKGROUND OF THE INVENTION

I. Field of the Invention

The present invention relates to a newly constructed transport plug which can pneumatically transport solid materials efficiently at a low speed in a transport pipe having curved portions such as a bend pipe and to a pneumatic transport method in which solid materials are pneumatically transported at a low speed by the use of the transport plug.

II. Prior Art

The applicants of the present invention have proposed a pneumatic transport method and a pneumatic transport system wherein solid materials such as medical tablets are pneumatically transported at a low speed without causing cracks and breaks by the use of a transport plug comprising two bodies and flexible connecting means in Japanese Patent Application JP-A-H2-196002. (filed on Jul. 24, 1990)

Figure 4:
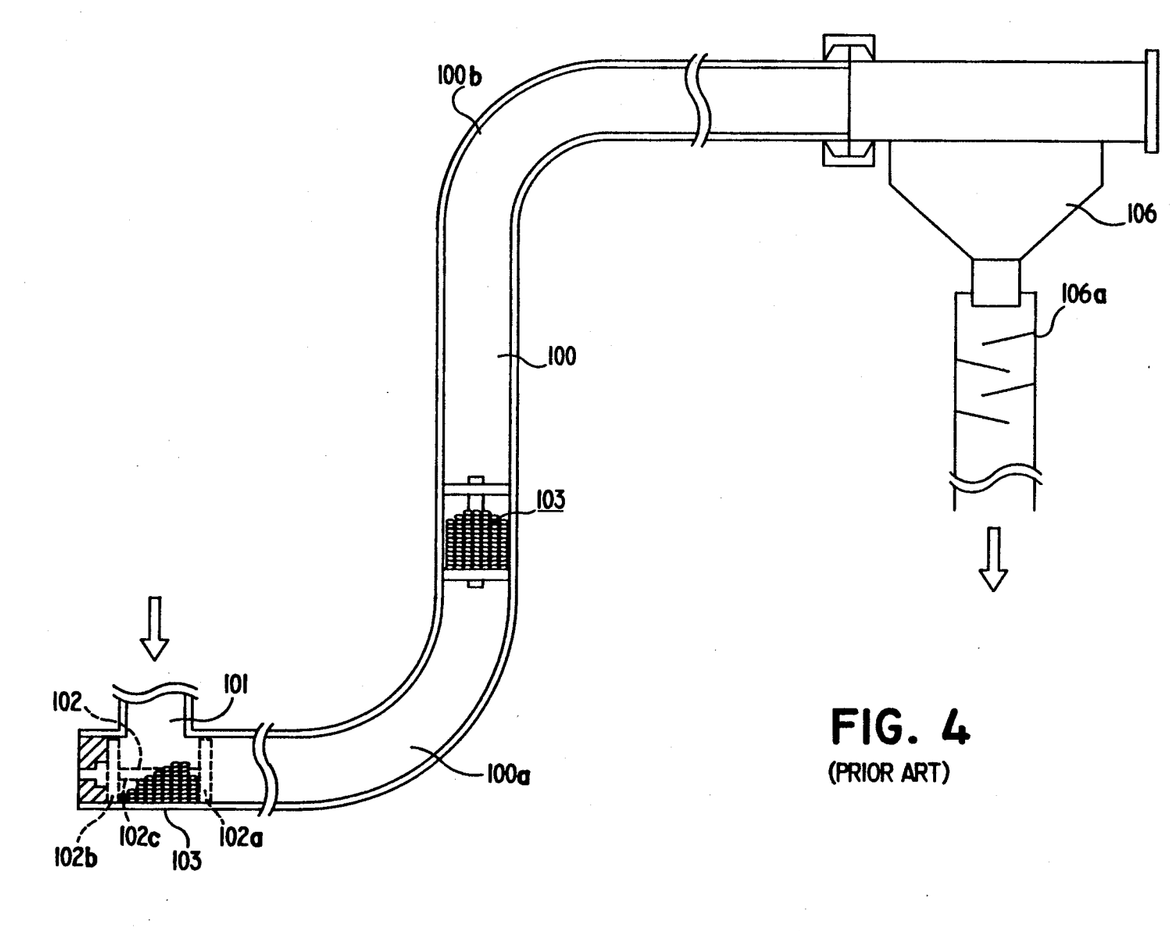
FIG. 4 is a schematic diagram of a conventional pneumatic transport system employing a transport plug.

According to the proposed method, as shown in FIG. 4, a transport plug 102 comprising two bodies 102a, 102b and flexible connecting means 102c is located at a starting position under a material insert port 101 provided at an initial end of a transport pipe 100 having bend pipes 100a and 100b. A fixed amount of weighed solid materials is fed into a storing space between the two bodies 102a, 102b of the transport plug 102, and the transport plug 102 filled with the solid materials 103 is pneumatically transported by the use of a pressurized transport gas supplied from the initial end of the transport pipe 100 toward the rear body 102b of the transport plug 102. Then the transport plug 102 is transported into a collector 106 connected at a terminal end of the transport pipe 100 and provided with a zigzag shooter 106a at its bottom. Thereafter, the transport plug 102 finishes transporting the solid materials, gas supply means (not shown) stops supplying gas and switches to suck air in the transport pipe 100, and the transport plug 102 is sucked and returned to the start position directly under the material insert port 101. Then next fixed amount of solid materials is fed into the storing space between the two bodies 102a, 102b of the transport plug 102 and the transport plug 102 is pneumatically transported by the use of the pressurized gas supplied into the transport pipe 102. Such steps are repeatedly performed and solid materials are successively transported into the collector 106 without causing any cracks or breaks.

In order to obtain a large transport capacity at one time and to facilitate feeding of solid materials, it would be preferred to make an inside diameter of the material insert port 101 provided at an initial end of the transport pipe 100 as large as possible adapting to an inside diameter of the transport pipe 100.

Figure 5A:
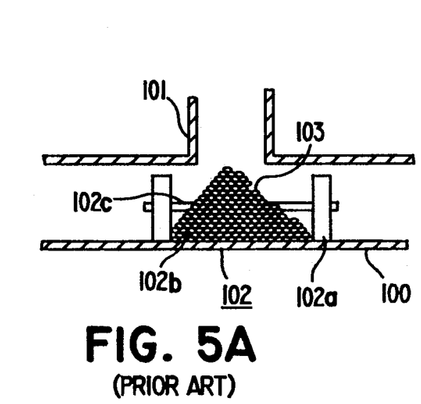
FIGS. 5(a)-(c), FIGS. 6(a)-(c) and FIG. 7 show problems of a conventional transport plug.
Figure 5B:
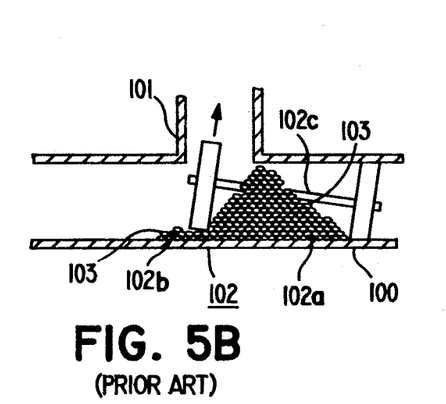
Figure 5C:
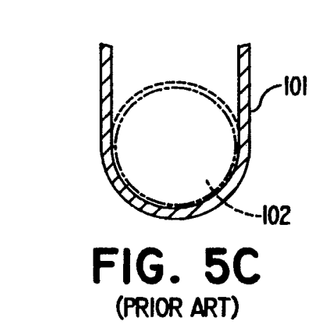

And when the inside diameter of the material insert port 101 is formed almost the same as that of the transport pipe 100, of which sectional view is shown in FIG. 5(c), relatively large amount of solid materials 103 would be filled in the storing space between the two bodies 102a, 102b of the transport plug 102, as shown in FIG. 5(a). However, when the transport plug 102 transfers into the transport pipe 100 from the material insert port 101, the top of heaped solid materials would be cut by rubbing with an upper wall of the transport pipe 100 and some of the cut materials would fall over the rear body 102b. And further, when the rear body 102b reaches under an opening of the insert port 101, the rear body 102b would be lifted. As the result, a gap would be made between the rear body 102b and a lower inside wall of the transport pipe 100, and some of the solid materials 103 would leak from the space, as shown in FIG. 5(b).

Figure 6A:
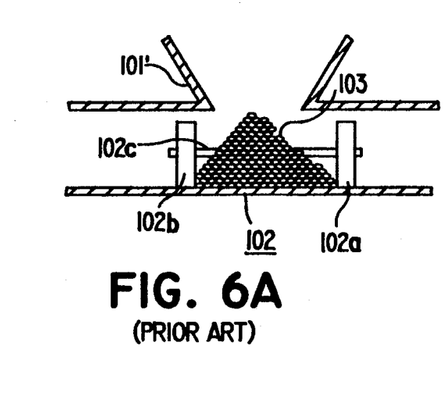
Figure 6B:
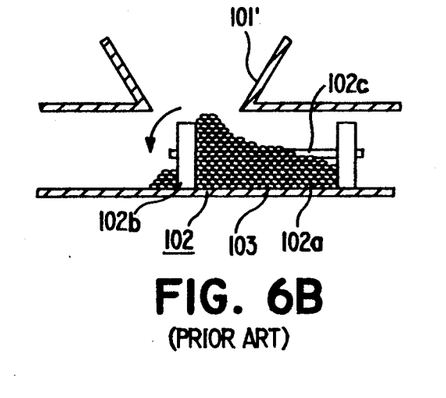
Figure 6C:
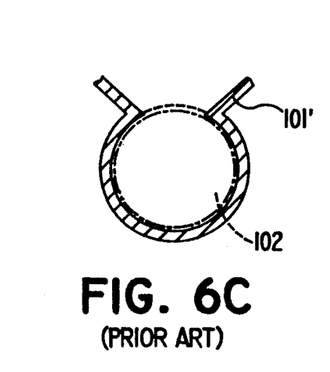

Generally, a tapered material insert port 101' having a smaller inner diameter than the transport pipe 100, as shown in FIG. 6(c), is provided at an initial end of the transport pipe 100 in order not to lift the rear body 102b of the transport plug 102 when the rear body 102b reaches under the opening of the insert port 101'. However, when solid materials 103 are fed into a storing space between the bodies 102a, 102b of the transport plug 102, the fed materials 103 would heap highly in the insert port 101' because of an angle of repose of the solid materials and a filling rate of the materials would become low, as shown in FIG. 6(a).

And further, when the transport plug 102 filled with solid materials 103 is transferred into the transport pipe 100 by the use of a transport gas, some of the solid materials 103 would be cut by rubbing with an upper wall of the transport pipe 100 and some of them would fall over the rear body 102b and some of them would be caught between the rear body 102b and the upper wall of the transport pipe 100, as shown in FIG. 6(b).

Figure 7:
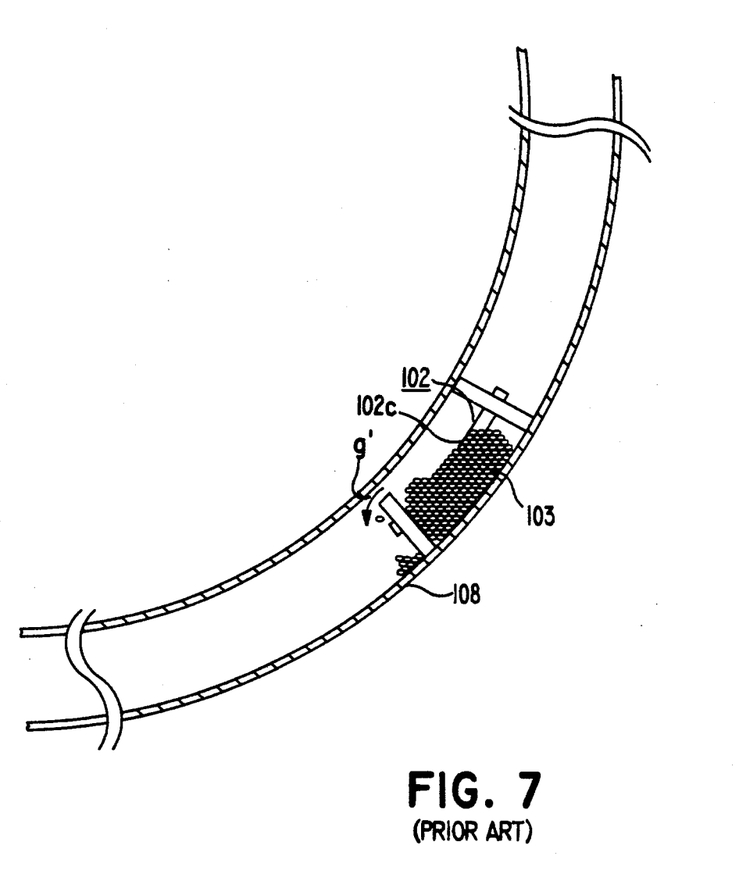

In addition, when the transport plug 102 containing solid materials 103 is transported upwardly in a curved portion 108, such as a bend pipe, of the transport pipe 100, the connecting means 102c would bend corresponding to a bending rate of the bend pipe. Consequently, as shown in FIG. 7 a crescent-shaped space g' is created between the bodies 102a, 102b and an upper inner wall of the curved portion 108. In this situation, when the space g' becomes larger than the particle size of the solid materials 103 or the same as the particle size, some of the materials 103 would drop out of the transport plug 102 or they would be caught in the space g' when the materials 103 are transported.

If some solid materials are dropped or caught in the transport pipe 100 while they are fed or transported, such materials would become obstacles and be cracked or broken when the transport plug 102 is returned to the starting position. It should be noted that this is considered to be an important and unignorable problem in order to transport solid materials by the use of the transport plug 102 in the transport pipe 100 without causing any cracks or breaks.

SUMMARY OF THE INVENTION

The present invention is proposed in order to solve the above-mentioned problem. Accordingly, an object of the present invention is to provide a transport plug for pneumatically transporting solid materials. The transport plug can contain a large amount of solid materials and effectively prevent the materials from being caught in a gap or dropped when the materials are transported upwardly in a curved portion such as a bend pipe. And another object of the present invention is to provide a pneumatic transport method of solid materials by the use of the transport plug.

In order to achieve the above-mentioned objects a transport plug according to the present invention comprises two bodies defining a space for storing solid materials, at least one supplementary body coupled behind a rear body of the two bodies, and flexible connecting means coupling these three bodies.

Another transport plug according to the present invention is characterized in that an outside diameter of a rear body defining a material storing space is smaller than that of a front body of the transport plug.

In a pneumatic transport method of solid materials by the use of a transport plug according to the present invention, solid materials are fed from a material insert port provided at an initial end of a transport pipe into a space formed between two bodies of the transport plug and the transport plug is pneumatically transported in the transport pipe at a low speed by the use of a pressurized transport gas.

Figure 3A:
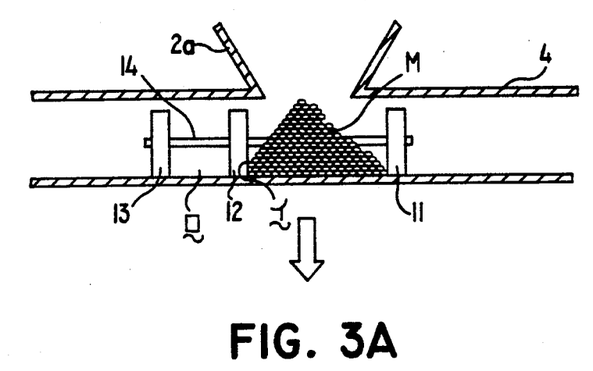
FIGS. 3(a)-(c) show operations of a transport plug according to the present invention.

In the present invention, a transport plug A is located directly under a material insert port 2a provided at an initial end of a transport pipe 4, and weighed solid materials are fed from the material insert port 2a into a material storing space X formed between a front body 11 and a rear body 12 of the transport plug A. Then the fed materials M are filled and heaped with an angle of repose in the space X. (See FIG. 3(a))

Figure 3B:
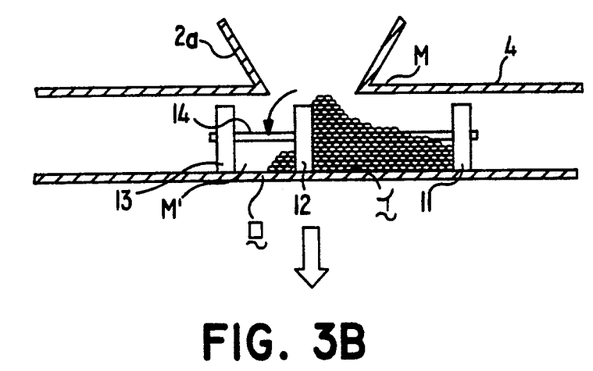

Then a transport gas is supplied into the transport pipe 4 so as to pneumatically transport the transport plug A filled with the solid materials M. When the transport plug A goes into the transport pipe 4 from the material insert port 2a, the materials M heaped in the material storing space X formed between the front body 11 and the rear body 12 are cut by rubbing with an upper wall of the transport pipe 4 and some materials M' drop over the rear body 12 or some materials remain in the material insert port 2a. These dropped or remained materials are received in a space Y formed between the rear body 12 and a supplementary body 13 and thereafter the materials are pneumatically transported while contained in the space Y. (See FIG. 3(b))

Figure 3C:
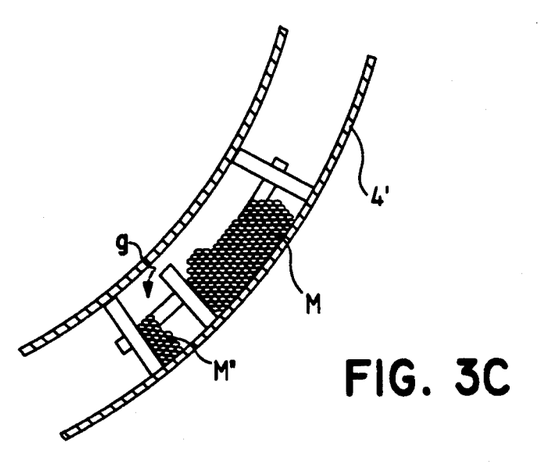

When the transport plug A goes upwardly in a curved portion 4' such as a bend pipe, a space g is created between the rear body 12 and an upper inner wall of the transport pipe 4 and some materials M" drop through the space g. However, the dropped materials M" are received in the space Y formed between the rear body 12 and the supplementary body 13. Then the materials M" received in the space Y are kept in the opposite side of the space g formed by the gravity of the transport plug A, and the materials M" don't fall further, nor are they caught between the pipe wall and the transport plug A. (See FIG. 3(c))

According to another construction of a transport plug A', a rear body 12' is made smaller than a front body 11. Therefore, solid materials are scarcely caught between the rear body 12' of the transport plug A' and an inner wall of a transport pipe 4 when solid materials are fed into a space X' between two bodies of the transport plug A'. Further, some solid materials which are cut by rubbing with an upper wall of the transport pipe 4 can be easily stored in a supplementary space Y' from an upper space of the rear body 12' when the transport plug A' goes into the transport pipe 4 from a material insert port 2a and the materials can be pneumatically transported together with the transport plug A'.

DETAILED DESCRIPTION OF THE EMBODIMENT

The present invention will be described referring to the attached drawings.

Figure 1:
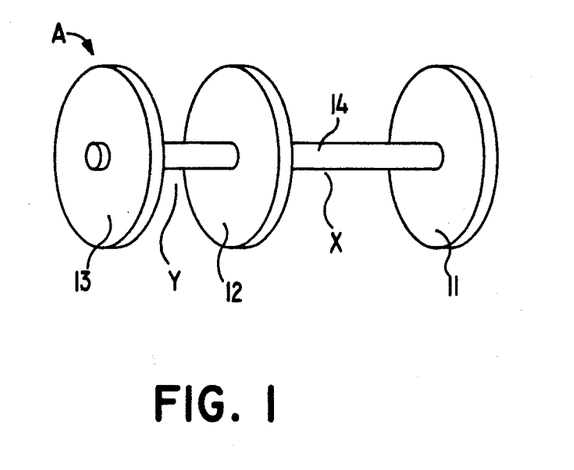
FIG. 1 is a perspective view of one embodiment of a transport plug according to the present invention.
Figure 1A:
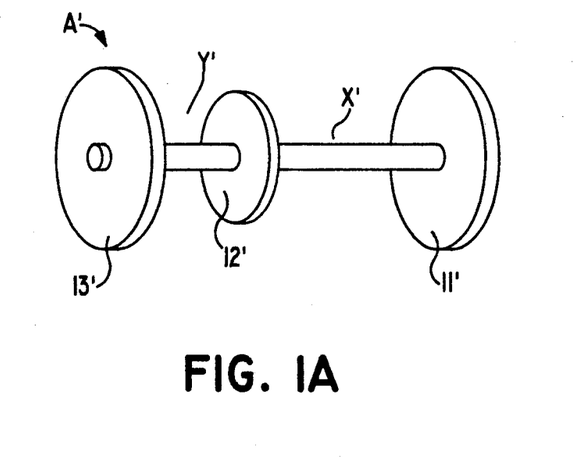
FIG. 1A is a perspective view of another embodiment of a transport plug according to the present invention.

The transport plug A of FIG. 1 according to the present invention comprises two bodies 11, 12 made of Teflon, one supplementary body 13 behind the two bodies, and connecting means 14, made of a flexible material such as Silicon Resin, which couples three bodies 11, 12, 13.

The outer diameters of three bodies 11, 12, 13 of the transport plug A are slightly smaller than the inner diameter of the transport pipe 4. A larger space X is defined with the front body 11 and the rear body 12 for storing solid materials when the transport plug A is housed in the transport pipe 4. A smaller supplementary space Y is defined with the rear body 12 and the supplementary body 13 for storing solid materials which are dropped from the space X when the materials are transported.

A space between the bodies 11, 12, 13 of the transport plug A and the transport pipe 4 is set appropriately in order that solid materials don't drop through the space while transported and the transport plug A can move smoothly in the transport pipe 4 without being blockaded.

In the figure the supplementary body 13 is integrally coupled behind the two bodies consisting of a front body 11 and a rear body 12 by flexible connecting means 14. However, more than two supplementary bodies may be coupled with a fixed space therebetween behind the material storing space X. Such a transport plug has higher labyrinth effect and prevents leakage of a pressurized gas supplied behind the transport plug, so that the transport plug can obtain effective force to go forward in the transport pipe.

FIG. 1A shows a basic construction of another transport plug A' according to the present invention. A rear body 12' of the transport plug A' is smaller than a front body 11'. The difference between the outer diameter of the rear body 12' and that of the front body 11' is set appropriately in order that the solid materials cut by rubbing with an upper wall of a transport pipe when the transport plug A' moves from a material insert port 2a into the transport pipe 4, can smoothly drop through the space formed over the rear body 12' into a supplementary space Y'. The outside diameter of the supplementary body 13' is the same as that of the front body 11'. The numeral 14' indicates connecting means and X' indicates a material storing space.

Figure 2:
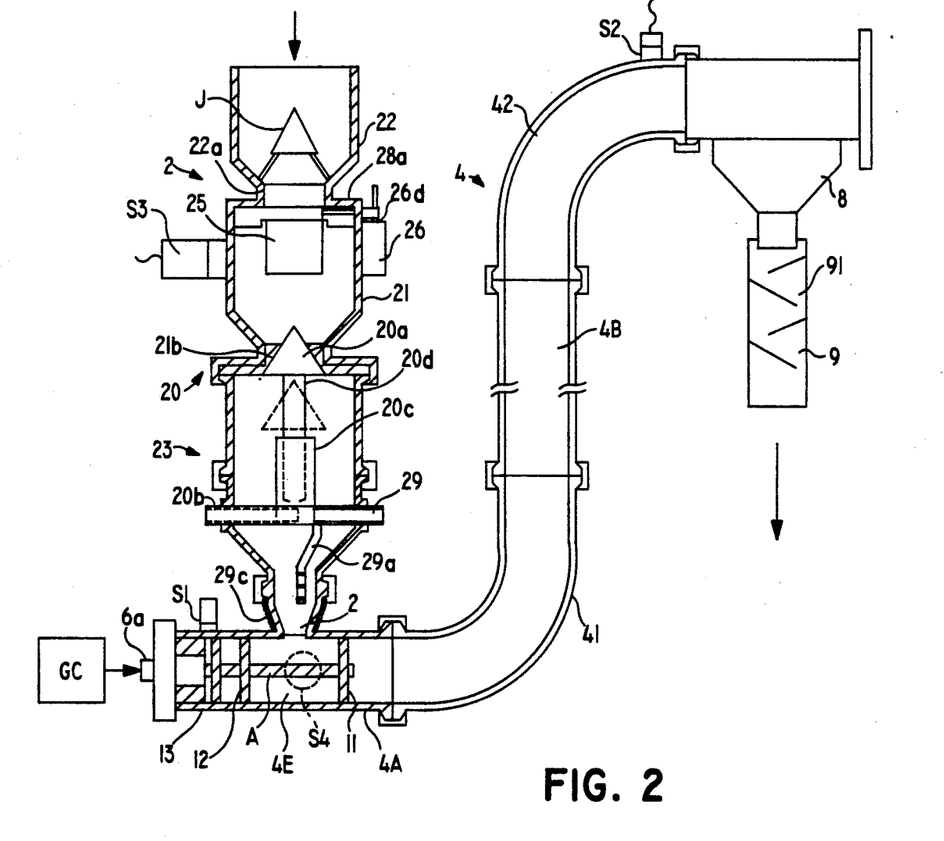
FIG. 2 is a schematic diagram of a pneumatic transport system for solid materials in order to perform the present invention.

FIG. 2 is a schematic diagram of a pneumatic transport system for transporting medical tablets by employing a transport plug A.

Medical tablets continuously manufactured in a tablet molding machine (not shown) are eliminated their extra powder by a powder eliminator. And the medical tablets are fed into an airtight transport tank 2 including a packer type damper and a conic valve and they are weighted therein. Then the medical tablets are fed into a material storing space between the front body and the rear body of the transport plug A located at an initial end portion of the transport pipe 4.

After the medical tablets are stored in the material storing space of the transport plug A, a pressurized gas is supplied into the transport pipe 4 from an initial end thereof. The transport plug A is pushed out into the transport pipe 4 by the force of the pressurized gas, and pneumatically transported through the transport pipe 4 at a very low speed. When the transport plug A finally reaches a material falling port (not shown) of a collector 8, the medical tablets fall from the material falling port by gravity into a storage reservoir (not shown) through a shock absorbing shooter 9, and they are stored in the storage reservoir.

Now each structure of the present system is explained. A transport pipe 4 has a transport plug housing portion 4E at a base of an initial end portion thereof for housing a transport plug A. In FIG. 2 the transport plug housing portion 4E is provided directly under a material insert port 2a of an airtight transport tank 2.

The transport pipe 4 is constructed such that a large caliber lower horizontal pipe 4A is connected with a lower end of a large caliber vertical riser pipe 4B through a bend pipe 41, another bend pipe 42 is connected with an upper end of the vertical riser pipe 4B, and a terminal end of the bend pipe 42 is connected with a collector 8 having a shock absorbing shooter 9 in which several boards 91 are provided zigzag for absorbing shock. A gas supply pipe 6a is connected at an initial end of the transport pipe 4. The gas supply pipe 6a supplies a pressurized transport gas provided from gas control means GC for transporting the transport plug A and sucks air for returning the transport plug A from a terminal end of the transport pipe 4 into the transport plug housing portion 4E after material transportation is finished.

In the embodiment, a conic valve 20a of the airtight transport tank 2 also serves as means for opening to atmosphere when the transport plug A is forcibly returned to the transport plug housing portion 4E in the transport pipe 4 by blowing gas by the use of air purge control means, described hereafter. However, a switching valve which is connected to atmosphere can be provided at an initial end side of the transport plug housing portion 4E.

Sensors S1 and S2 are provided for the transport pipe 4 for detecting the transport plug A. The sensor S1 is provided at the transport plug housing portion and the sensor S2 is provided at the terminal position of the transport plug A. When the transport plug A reaches the collector 8, the sensor S2 detects and stops the transport plug A. Then the transport plug A is further transported into the material falling port by the force of intermittent supply of the transport gas. After a fixed delay time which is enough to fall the transported medical tablets from the material falling port of the collector 8, the transport gas control means GC is switched into a suction mode so as to return the transport plug A to the transport plug housing portion 4E. When the transport plug A finishes transportation of medical tablets and is forcibly returned to the housing portion 4E, the sensor S1 detects the transport plug A and the action of suction mode of the transport gas control means GC is stopped. Then the conic valve 20a of the airtight transport tank 2 is opened, another fixed amount of medical tablets stored and weighed in the airtight transport tank 2 is fed into the space X of the transport plug A from the material insert port 2a for preparing next transportation. The transport plug A may be provided with a magnetic piece so that the transport plug A is stopped by exciting an electromagnet provided at one part of the transport pipe 4. However, stopping means of the transport plug A is not limited to this method. A sensor S4 detects the finish of transportation by the residual amount of medical tablets to be transported. Any kind of sensors such as color sensors and photosensors which can detect the presence of the transport plug A can be adopted as the sensors S1 and S2.

The airtight transport tank 2 is comprised of a material insert hopper 22 with a tapered shape, a material measuring chamber 21 for weighing materials to be transported at one time by the transport plug A, and a valve housing 23 provided with an airtight valve mechanism 20 at its upper part. The material measuring chamber 21 is connected under the material insert hopper 22 and the valve housing 23 is connected under the material measuring chamber 21. The transport plug housing portion 4E is formed directly under the material insert port 2a of the valve housing 23 and is connected to the lower horizontal pipe 4A of the transport pipe 4. An earth wire 29c is wound around the valve housing 23 made of resin so that a static electric charge generated in the valve housing 23 is relieved and the medical tablets are prevented from attaching to an inner wall of the valve housing 23 by the act of the static electric charge. The numeral 29a indicates a discharge pipe for a pressurized air and the discharge pipe has a plurality of vent holes. The discharge pipe 29a discharges the pressurized air at a suitable time after medical tablets are fed into the space X of the transport plug A in order to prevent medical tablets from attaching into the inner wall of the valve housing 23 and from bridging in the material insert port 2a.

In FIG. 2 a conic valve is used for the airtight valve mechanism 20. The valve housing 23 includes a T-shaped axial body 20b having a branch pipe constructed as a passage to introduce a pressurized air supplied form valve control means (not shown). A cylindrical body 20d which is made of Teflon and fixed under a beveled valve plug 20a is inserted into a rising pipe 20c of the axial body 20b.

According to such constructed conic valve, when a pressurized air is supplied from the valve control means, the beveled valve plug 20a is pushed upward and closes a material discharge port 21b of the material measuring chamber 21. And when the valve control means stops supplying the pressurized air, the beveled valve plug 20a descends by gravity and the material discharge port 21b is opened.

A shock absorbing cone J having three support legs is provided in the material insert hopper 22 connected over the material measuring chamber 21. And one side of a material receiver 25 having a gently curved receiving face 25a is attached below the cone J by means of a hinge 28 so as to be able to open and close. (See FIGS. 2A and 2B)

Figure 2A:
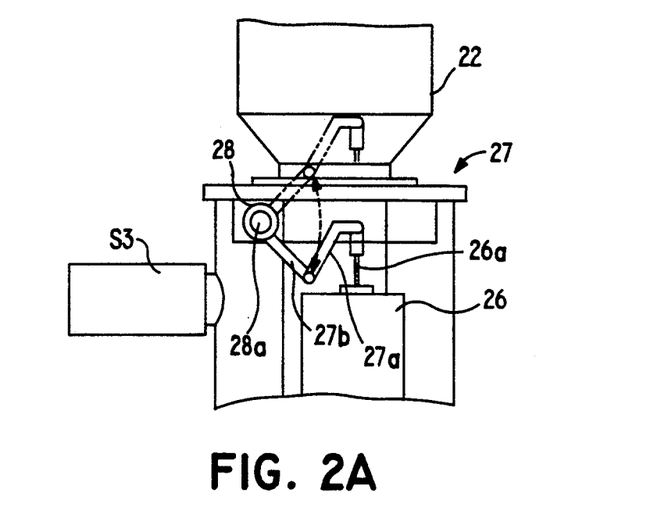
FIGS. 2A and 2B show a packer type damper mechanism.
Figure 2B:
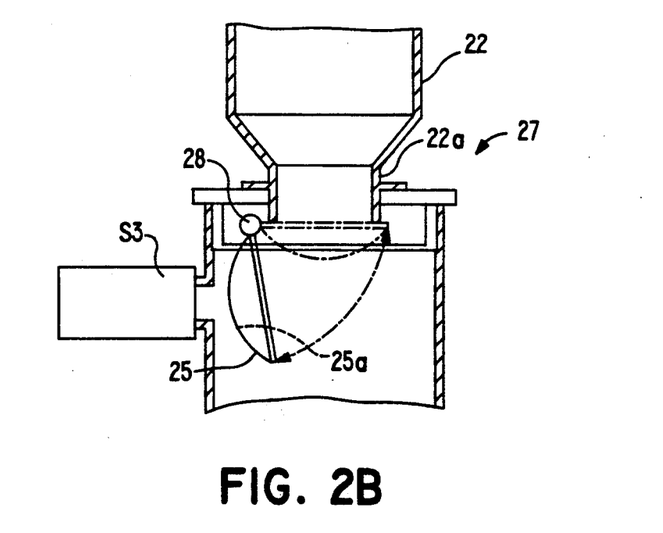

The material receiver 25 opens and closes the material discharge port 22a by rotating a link mechanism 27 which is interlocked with a rod 26a of an air cylinder 26 provided outside of the material measuring chamber 21. According to this link mechanism 27, as shown in FIG. 2A, an arm 27b fixed with a shaft 28a of the hinge 28 is pivotally connected to a hook-like link arm 27a and is provided at the initial end of the rod 26a of the air cylinder 26. Therefore, when the link mechanism 27 is descended as shown in solid lines in FIG. 2A by descending the rod 26a of the air cylinder 26, the shaft 28a of the hinge 28 of the material receiver 25 is rotated, the material receiver 25 is descended as shown in FIG. 2B, and the material discharge port 22a of the hopper 22 is opened. When the link mechanism 27 is lifted as shown in chain lines in FIG. 2A, the shaft 28a of the hinge 28 of the material receiver 25 is rotated in reverse, the material receiver 25 is lifted as shown in chain lines in FIG. 2B, and the material discharge port 22a of the hopper 22 is closed.

Such a packer type damper mechanism has a simple construction. Moreover, even if solid materials are continuously fed from the material insert hopper 22, falling materials are received by the material receiver 25 having the curved surface 25a. Therefore, the materials are not caught in a gap nor damaged.

A pair of material receivers (not shown) which are slightly overlapped with enough space therebetween to pass through one medical tablet when closed may be provided so as to open and close.

According to such an airtight transport tank 2, the shock absorbing cone J provided in the material insert hopper 22 is effective in preventing materials from bridging at the discharge port 22a. Moreover, the material receiver 25 receives a constant load without receiving a sudden load even if a large amount of solid materials is continuously fed into the hopper 22 because the cone J serves as a shock absorber.

Next, control operations of material transportation are explained according to the present invention.

Solid materials fed from a tablet molding machine fall into a material measuring chamber 21 of an airtight transport tank 2. At this time a valve plug 20a of a conic valve closes a discharge port 21b of the material measuring chamber 21. When a fixed amount of solid materials is stored in the material measuring chamber 21, a level sensor S3 detects that, a material receiver 25 of a packer type damper is rotated to close an introduction port 22a of the storage tank 21, consequently one filling amount of materials to be fed into a transport plug A is weighed. When the valve plug 20a of the conic valve is descended, the solid materials stored in the storage tank 21 fall by gravity and are received in a material storage space X of the transport plug A.

Then, a pressurized transport gas is supplied from a gas supplying pipe 6a and the transport plug A is transferred slowly by the act of the transport gas. An angle of repose of the solid materials heaped in the material storage space X becomes gradually destroyed and some materials which go over a rear body 12 of the transport plug A are stored in a supplementary space Y. It is preferred that the transport gas is intermittently supplied by an inching operation before the rear body 12 of the transport plug A comes ahead of the material inserting port 2a so as not to have unnecessary impact on the transport plug A. Further, the transport plug A is pneumatically transported through a transport pipe 4. At this time the transport gas is set so as to transport the transport plug A at a very low speed. The transport plug A also rises in a vertical rising pipe 4B at a very low speed. Therefore, solid materials can be transported in the transport pipe 4 without receiving any impact.

In bend pipes 41 and 42, connecting means 14 of the transport plug A curves according to a bending rate of the bend pipes 41 and 42. Then a space g is generated between the rear body 12 of the transport plug A and the inner wall of the transport pipe 4. Even if some materials drop through the space g, such materials are contained in the supplementary space Y and transported together with the transport plug A. (see FIG. 3(c))

The transport plug A slowly moves in the transport pipe 4 and once stops when detected by the sensor S2. Then the transport plug A is transferred into a material falling port of a collector 8 by the force of intermittent supply of the transport gas by an inching operation. When the transport plug A reaches the material falling port, the transport gas leaks from the material falling port so that the transport plug A loses pushing force and the solid materials stored in the material storage X and the supplementary space Y fall into the collector 8 from the material falling port by gravity.

After the transportation of solid materials into the collectors 8 is finished, gas control means GC sucks air in the transport pipe 4 through a gas supply pipe 6a and the the transport pipe 4 through a gas supply pipe 6a and the transport plug A is returned to a transport plug housing portion 4E. Air purge control means (not shown) may be provided at the terminal end portion of the transport pipe 4 above the collector 8 in order not to lose sucking force of the gas control means GC because of the hole of the material falling port of the collector 8. And a gas injection pipe of the air purge control means blows gas toward the transport plug A so that the transport plug A is slightly reversed from the material falling port toward the initial end of the transport pipe 4. Then the transport plug A is returned to the housing portion 4E by the sucking action of the gas supply pipe 6a.

According to the present invention, solid materials are transported while stored in the transport plug A as described above. Therefore, the transport pipe 4 isn't required to be filled with solid materials. And bridging of solid materials isn't caused. Moreover, the transport plug A is made of a flexible material so as to be elastically deformed according to the curves of the transport pipe 4 so that the transport plug A can curve smoothly in the transport pipe 4.

When the transport pipe 4 is relatively short, the transport plug A may be returned to the transport plug housing portion 4E by use of the air purge control means. At this time, means for opening to atmosphere may be provided at the initial end portion of the transport plug housing portion of the transport pipe 4, and such means is preferably opened before the pressurized gas is injected from the air purge control means.

According to the transport plug A of the present invention, solid materials aren't caught in a gap when they are fed from the material insert port 2a. Some solid materials escaped from the material storing space X can be stored in the supplementary space Y.

And if a space g is created between the rear body 12 of the transport plug A and an upper inner wall of the transport pipe 4 when the transport plug A rises in a curved portion such as a bend pipe, some solid materials dropped through the space g can be stored in the supplementary space Y and transported. Therefore, solid materials aren't caught nor dropped while they are transported.

Moreover, solid materials are not caught with each other in the transport pipe 4 because solid materials can be pneumatically transported at a very low speed while kept in the transport plug A of the present invention. And a large amount of solid materials can be pneumatically transported at one time without being caught in a gap or dropped by enlarging the size of the transport plug A adapting to a diametr of the transport pipe 4.

What is claimed is:

1. A transported plug for pneumatically transporting solid materials in a transport pipe by the use of a pressurized transport gas, comprising:
    a front body and a rear body, said front and rear bodies spaced apart and defining a space for storing solid materials therebetween;
    at least one supplementary body connected to said rear body, a supplementary material storing space being defined between said at least one supplementary body and said rear body, said supplementary material storing space being smaller than said storing space and being for solid materials which have fallen out of said storing space; and
    a connecting bar coupling together said three bodies, said connecting bar being made of a flexible material.

2. A transport plug for pneumatically transporting solid materials in a transport pipe by the use of a pressurized transport gas, comprising:
    a front body and a rear body, said front and rear bodies being spaced apart and defining a space for storing solid materials therebetween, an outside diameter of said rear body being smaller than the outside diameter of said front body;
    at least one supplementary body connected to said rear body, supplementary material storing space being defined between said at least one supplementary body and said rear body; and
    flexible connecting means coupling said three bodies.

3. A pneumatic transport method wherein said transport plug as set forth in claim 1 or 2 is pneumatically transported in a transport pipe having curved portions. said transport method comprising the steps of:
    feeding solid materials into said storing space made between said front body and said rear body of said transport plug from an insert port provided at an initial end of said transport pipe;
    pneumatically transporting said transport plug at a low speed by supplying a pressurized transport gas into said transport pipe; and
    receiving the transported material in a collector provided at a terminal end of said transport pipe under gravitational fall.

4. A pneumatic transport method wherein said transport plug as set forth in claim 1 or 2 is pneumatically transported in a transport pipe having curved portions by executing following steps repeatedly at fixed intervals, said transport method comprising the steps of:
    feeding solid materials into said storing space made between said front body and said rear body of said transport plug from an insert port provided at an initial end of said transport pipe;
    pneumatically transporting said transport plug at a low speed by applying a pressurized transport gas into said transport pipe;
    receiving the transported solid materials in a collector provided at a terminal end of said transport pipe under gravitational fall; and
    returning said transport plug into a transport plug housing portion provided at said initial end of said transport pipe by means of valve control means.

* * * * *